(12) United States Patent
Yeow et al.

(10) Patent No.: US 9,204,322 B2
(45) Date of Patent: Dec. 1, 2015

(54) COMMUNICATION DEVICES AND METHODS FOR PERFORMING COMMUNICATION

(75) Inventors: Wai Leong Yeow, Singapore (SG); Shoukang Zheng, Singapore (SG); Anh Tuan Hoang, Singapore (SG); Jaya Shankar s/o Pathmasuntharam, Singapore (SG); Haiguang Wang, Singapore (SG); Chee Ming Joseph Teo, Singapore (SG); Choong Hock Mar, Singapore (SG)

(73) Assignee: Agency for Science, Technology and Researach, Singapore (SG)

(*) Notice: Subject to any disclaimer, the term of this patent is extended or adjusted under 35 U.S.C. 154(b) by 273 days.

(21) Appl. No.: 14/002,830

(22) PCT Filed: Mar. 2, 2012

(86) PCT No.: PCT/SG2012/000069
§ 371 (c)(1),
(2), (4) Date: Nov. 8, 2013

(87) PCT Pub. No.: WO2012/118450
PCT Pub. Date: Sep. 7, 2012

(65) Prior Publication Data
US 2014/0056124 A1   Feb. 27, 2014

(30) Foreign Application Priority Data

Mar. 3, 2011  (SG) ................... 201101531
Mar. 11, 2011  (SG) ................... 201101771
May 12, 2011  (SG) ................... 201103402

(51) Int. Cl.
*H04L 12/26*   (2006.01)
*H04W 24/04*   (2009.01)
(Continued)

(52) U.S. Cl.
CPC .......... *H04W 24/04* (2013.01); *H04L 41/0668* (2013.01); *H04L 69/40* (2013.01); *H04W 8/30* (2013.01); *H04W 40/246* (2013.01); *H04L 41/12* (2013.01); *H04W 40/248* (2013.01)

(58) Field of Classification Search
CPC ..... H04W 40/246; H04W 8/30; H04W 24/04; H04W 28/16; H04L 41/0668; H04L 69/40; H04L 5/1438; H04L 5/143; H04B 7/15557; H04B 1/74
See application file for complete search history.

(56) References Cited

U.S. PATENT DOCUMENTS 7,646,752 B1   1/2010  Periyalwar et al.
2002/0164981 A1   11/2002  Parkman

FOREIGN PATENT DOCUMENTS

WO   WO2009053954   4/2009

OTHER PUBLICATIONS

Godfrey, 802.16n System Requirements Document Including SARM Annex, 1 IEEE 802.16n-10/0048r3 (IEEE 2011).
(Continued)

*Primary Examiner* — Faruk Hamza
*Assistant Examiner* — Aixa Guadalupe-Cruz
(74) *Attorney, Agent, or Firm* — K. David Crockett, Esq.; Niky Economy Syrengelas, Esq.; Crockett & Crockett, PC

(57) ABSTRACT

A infrastructure station in a cellular mobile communication system, the infrastructure station includes a infrastructure station core configured to provide infrastructure station functionality to a plurality of dependent stations, a topographer configured to discover a network topology and designate a failover topology from the network topology for use in the event that the infrastructure station fails thereby no longer being capable of providing infrastructure station functionality to the plurality of dependent stations, the failover topology comprising failover stations, and a synchronizer configured to periodically provide timing estimates of dependent stations to the failover stations such that network reentry after infrastructure station failure is shorter than normal network entry.

17 Claims, 4 Drawing Sheets

(51) Int. Cl.
*H04W 40/24* (2009.01)
*H04L 12/24* (2006.01)
*H04W 8/30* (2009.01)
*H04L 29/14* (2006.01)

(56) References Cited

OTHER PUBLICATIONS

IEEE Standard for Local and Metropolitan Area Networks—Part 16: Air Interface for Broadband Wireless Access Systems; Amendment 3: Advanced Air Interface, IEEE Standards Association 1 (IEEE 2011).

COMMUNICATION DEVICES AND METHODS FOR PERFORMING COMMUNICATION

RELATED APPLICATIONS

The present application claims priority to the following Singapore Patent Applications: 201101531-0 filed on Mar. 3, 2011, 201103402-2 filed on May 12, 2011, and 201101771-2 filed on Mar. 11, 2011, all of which are herein incorporated by reference in their entirety.

FIELD OF THE DISCLOSURE

Embodiments of the invention generally relate to a communication terminal and a method for performing communication.

BACKGROUND

The IEEE 802.16n System Requirements Document (SRD) specifies a requirement for High Reliability (HR) network. As such, one of the requirements is for the mobile stations (HR-MSs) to communicate directly with each other in the event of network failure. The HR-MS to HR-MS direct communications scenario could for example occur in the event of a disaster where the backbone network is destroyed. The rescue teams (e.g. firemen and police officers) would have to communicate directly with each other without a backbone network in order to provide disaster recovery.

SUMMARY

In a first implementation, a infrastructure station in a cellular mobile communication system, the infrastructure station includes a infrastructure station core configured to provide infrastructure station functionality to a plurality of dependent stations, a topographer configured to discover a network topology and designate a failover topology from the network topology for use in the event that the infrastructure station fails thereby no longer being capable of providing infrastructure station functionality to the plurality of dependent stations, the failover topology comprising failover stations, and a synchronizer configured to periodically provide timing estimates of dependent stations to the failover stations such that network reentry after infrastructure station failure is shorter than normal network entry.

In another implementation, a mobile station in a cellular mobile communication system includes a mobile station core configured to provide mobile station functionality by associating with a base station, and a failover station core configured to provide base station functionality to a plurality of dependent stations in the event that the mobile station is instructed to act as a base station as a result of a infrastructure station failure.

In a further implementation, a mobile station in a cellular mobile communication system includes a mobile station core configured to provide mobile station functionality by associating with a base station, and a failover station core configured to provide relay station functionality to a plurality of dependent stations in the event that the mobile station is instructed to act as a relay station as a result of a infrastructure station failure.

In yet another implementation, a method for maintaining persistent communication in the event of a base station failure in a cellular mobile communication system, the cellular mobile communication system comprising at least two mobile stations and a communication network for providing a communication connection between the at least two mobile stations via at least one base station of the communication network is provided. The method includes discovering a network topology, designating a failover topology from the discovered network topology for use in the event that an infrastructure station fails thereby no longer being capable of providing base station functionality to a plurality of dependent stations, providing fast network entry information such that network reentry after an infrastructure station failure is shorter than normal network entry, and storing the failover topology in a distributed manner throughout the cellular mobile communication system.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

The IEEE 802.16 standard family specifies a Media Access Control (MAC) and Physical layer communication protocols for cellular-based wireless communications. Recently, considering the necessity of communication in the case where infrastructure nodes are damaged due to war or disaster, the IEEE 802.16 working group has started a new task group, IEEE 802.16n, to enhance the reliability of the IEEE 802.16 technology.

Upon a infrastructure failure, such as a HR-BS or a HR-RS failure, the goal of various embodiments is to ensure that all stations in a pre-failure network end up in one of the following one of the following four networks after failure:

A standalone network where no other base stations or relay stations are reachable. Network connections that persist are limited to local connections between HR-MSs within the coverage of the failed HR-BS or HR-RS. Other legacy MSs and RSs that fall into this category cannot communicate.

A backup base station (BS) where a HR-MS in the network assumes the role of a HR-BS and other HR-MSs and HR-RSs are capable of joining the new HR-BS. Other legacy MS and RS may also join the new HR-BS.

Registration to another BS or RS in the vicinity.

Registration to another BS via a backup RS where a HR-MS in the network assumes the role of a HR-RS. HR-MS and HR-RS are capable of joining the BS via the new HR-RS and other legacy MS and RS may join the new HR-BS via the new HR-RS.

Various embodiments set up control signaling and further ensure that the signaling overhead is minimized.

In this disclosure the original HR-BS may be referred to as BS-0. A HR-MS which volunteers to be a backup BS or a backup RS may be referred to as B-BS and B-RS respectively. Other BSs in the vicinity may be referred to as BS-n where n>0.

Figure 1:
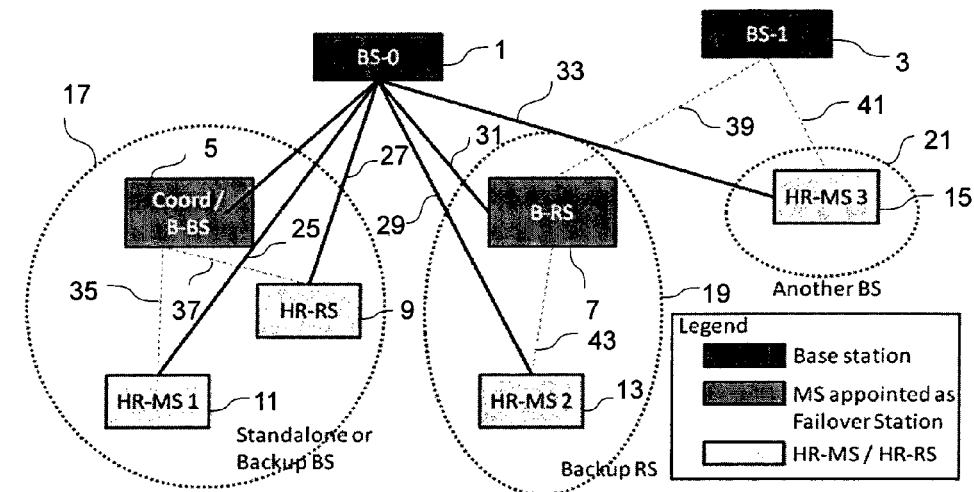
FIGS. 1-4 show communication systems according to embodiments.
Figure 2:
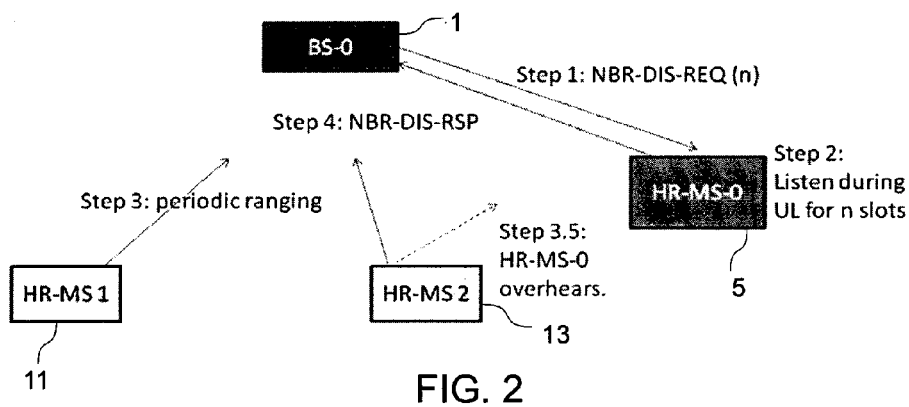
Figure 3:
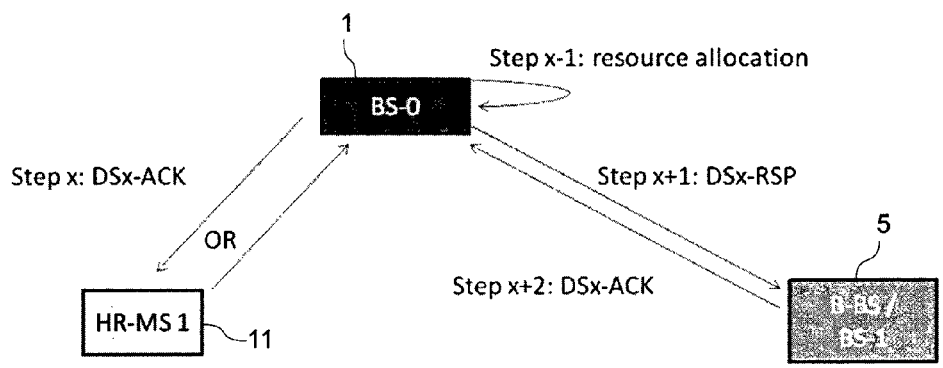

FIGS. 1-3 show communication systems according to embodiments. FIG. 1 illustrates the four networks, as described above, before and after BS-0 1 has failed. Solid lines represent the links with BS-0 1 before failure, whereas dotted lines represent the links after failure. Each dotted eclipse represents a (partitioned) network after failure. Network 21 is the case where another HR-BS 3 is in the vicinity, and connections related to HR-MS3 15 persist through BS-1 3 after BS-0 1 failed. The network 13 in the center is the case where a HR-MS 7, designated by BS-0 1, role-changed to HR-RS 7 and connections related to HR-MS2 13 persist through BS-1 3. The leftmost network 17 represents two cases: (i) standalone network and (ii) a HR-MS role-changed to HR-BS. In case (i), a HR-MS 5 is designated by BS-0 1 to be a coordinator 5 for the standalone network 17 to coordinate and facilitate direct MS-to-MS communications. In case (ii), a HR-MS 5 is designated by BS-0 1 to be its backup. The difference between the two cases is that in the former case, only local MS connections and multicast connections between HR-MSs 11 persist. In the latter case, local MS connections and multicast connections between HR-MSs or legacy MSs may persist. If there is backhaul connectivity, connections to other MS may persist as well.

The embodiment ensures the states of connections persist after a BS-0 failure. This includes multicast groups, sessions and keys, sleeping stations, and other configurations like multi-carrier mode.

A failover topology such as the one in FIG. 1 is designated by BS-0 1. Hence, the role of BS-0 1 is to discover the topology of the network and partition it such that connections will be maintained as much as possible upon BS-0 1 failure.

BS-0 1 will assist in obtaining timing estimates of its MS and RS to the failover stations so that network reentry to the failover topology can be completed as fast as possible. For example, ranging can be achieved faster since the timing estimates are known in advance.

Thus the base station 1 in the cellular mobile communication system depicted in FIG. 1 includes a base station core configured to provide base station functionality to a plurality of dependent stations 5, 7, 9, 11, 13, 15, a topographer configured to discover the network topology and designate a failover topology from the network topology for use in the event that the base station fails thereby no longer being capable of providing base station functionality to the plurality of dependent stations, the failover topology comprising failover stations, and a synchronizer configured to periodically provide timing estimates of dependent stations to the failover stations such that network reentry after base station failure is shorter than normal network entry.

Moreover, a mobile station 5 in the cellular mobile communication system depicted in FIG. 1 includes a mobile station core configured to provide mobile station functionality by associating with base station 1, and a failover station core configured to provide base station and/or relay station functionality to a plurality of dependent stations in the event that the mobile station is instructed to act as a base station and/or a relay station as a result of a base station failure.

A HR-MS indicates its backup capability to the HR-BS during network entry through a modified SBC-REQ message. If a HR-MS can support a role change to HR-BS and is willing to become a backup BS, or is willing to become a backup RS, the HR-MS should indicate this in the SBC-REQ message.

BS-0, upon receiving the message, records the capability and acknowledges with a modified SBC-RSP message. Note that BS-0 does not assign any role for the HR-MS yet; this procedure is purely to notify BS-0 of the HR-MS capabilities. Thus, the mobile station may be configured to send a SBC-REQ message upon network entry requesting base station functionality from a base station, the SBC-REQ message indicating that the mobile station is capable of being a failover base station and/or a failover relay station.

With reference to FIG. 2, BS-0 1 should designate the failover network topology such as that indicated, for example, in FIG. 1. To do so, BS-0 needs to acquire the list of neighbors of all MS and RS managed by BS-0. This will also obtain the timing estimates that are required for synchronization with failover stations.

One method of BS-assisted neighbor discovery is as follows. BS-0 1 may periodically signal to Mss 11, 13, 5 to perform periodic ranging and simultaneously instruct, via unicast, potential B-RS or B-BS stations 5 to listen on the uplink slot (UL) for the ranging codes of other MSs. We name this new message NBR-DIS-REQ. Hence, the potential B-RS and B-BS stations can discover their neighbors and obtain estimates of the synchronization offsets.

The potential coordinator, B-RS and B-BS stations 5 then subsequently report back to BS-0 1 the neighbor lists and respective synchronization offsets via a new message NBR-DIS-RSP.

Alternative methods for neighbor discovery may be used so long as the list of neighbors are reported back to BS-0 in order for BS-0 to compute a failover topology, i.e., partition its network.

BS-0 determines the failover topology from the neighbor lists and capabilities of the connected MS and RSs. As a guide, partitioning should match the capabilities of the MS to the failover stations. For example, a multi-carrier HR-MS should be matched to a multi-carrier B-BS or B-RS for failover. Further partitioning should minimize the number of standalone MS.

For standalone networks in the failover topology, BS-0 will designate a coordinator. Preference will be given to those which have role change to RS or BS capability but are unwilling to participate as backup.

After determining the failover topology, BS-0 unicasts failover configuration information, termed BSB-CFG, to all HR-MS and HR-RS in the network. In one embodiment, BSB-CFG may be a new message. In another embodiment, BSB-CFG may be appended to other network management messages.

The BSB-CFG message contains the respective failover stations for each HR-MS and HR-RS, and other configurations such as synchronization estimates, fast network entry information, for example, recommended ranging time and slot, STID, and newly generated security keys such as, for example, those required for multicast.

Unless BS-1 is the failover, all HR-MS should retain their STID since they are guaranteed to be unique after network partitioning. BS-0 only sends the full information in BSB-CFG to relevant MSs whenever there is a change in network of BS-0. Such a transmission may be necessary, for example, after a handover, network entry, or de-registration, otherwise only the synchronization estimates are sent periodically as per the previous section. This is to minimize the overhead required to maintain the connections.

Thus the base station may be configured to periodically instruct dependent stations to perform ranging with a set of ranging codes while concurrently instructing dependent stations capable of being failover stations to listen for the set of ranging codes and to report any resulting neighbor discoveries back to the base station, and the mobile station may be further configured to perform ranging with a set of ranging codes when instructed to do so by a base station. Similarly the mobile station may be configured to listen for the set of ranging codes and to report any resulting neighbor discoveries back to a base station when instructed to do so by the base station.

Legacy 802.16 MSs and RSs do not have such failover support. Instead, BS-0 will announce all failover stations in the periodically broadcasted MOB-NBR-ADV. The legacy devices will note the availability of such "base stations" and may perform network entry with them if a failover occurs. Thus the base station includes a legacy module configured to announce the failover stations to dependent stations having legacy hardware.

MSs may perform bandwidth requests, changes and deletion with DSx-REQ/RSP/ACK messages. BS-0 executes the bandwidth requests following the conventional 802.16 protocol, but will inform the respective failover station once resource has been allocated, for example, FID and scheduling is determined, with a modified DSx-RSP message.

The failover station may keep the DSx-RSP and notes the FID and SFID for book keeping purposes. Eventually when failover occurs, the failover station will honor the resource allocation on a best-effort basis. There are two advantages to this approach:

Higher Resource Utilization. If the resources were hard-guaranteed, the network will only have maximum of 50% efficiency since resources are doubled for failovers, which could be a rare event. Giving a best-effort guarantee results in higher resource utilization.

No Delay Penalty. Admission control is still decided by BS-0 alone. If hard-guarantees are enforced, then the failover station needs to be consulted for resource allocation as well. This is result in delay penalty, and also lower service admission rate.

With reference to FIG. 3, the sequence of messages that are exchanged in a dynamic service requests are shown. BS-0 1 performs the procedure required for dynamic service request that is defined by the 802.16 protocol, and subsequently informs the failover station 5 of the result.

MSs that goes into idle mode may be excluded as part of the failover topology since they are likely to handover to other BS. MSs that goes into sleep mode may be maintained at BS-0, but the failover station may not need to be informed in order to minimize overhead. Multicast groups are maintained by BS-0 1. The failover topology will use the same multicast group ID in the partitioned networks, but possibly with different sets of encryption keys for secured multicast connections. Thus the mobile station may be configured to maintain information on multicast groups for use by the failover station core in the event that the mobile station is instructed to act as a base and/or relay station as a result of a base station failure. Likewise, the base station is configured to maintain multicast groups and communicate the multicast groups to the fail over station in the failover topology. A periodic BSB-CFG message may doubles up as a keep-alive message. A base station failure could be detected by a single, or multiple consecutive timeouts from non-reception of BSB-CFG at the stations under the management of that base station. The BSB-CFG message could also carry a trigger which defines how a failure should be interpreted.

Once a failover station has determined that its base station has failed, it shall proceed to form the failover topology. For standalone coordinators and B-BS, the station will follow a predefined frame structure broadcast PREAMBLE and other network information and expect its failover member stations to perform fast network entry. For B-RS or HR-MS to link with another BS-1, it will perform a fast network entry to BS-1 and assume their role respectively.

For a station which is not a failover station, it shall attempt to join its respective failover station (FS) that is assigned via the most recent BSB-CFG message. Upon detection of the FS. It shall perform a fast network entry. Network entry is sped up by utilizing any available information in the most recent BSB-CFG message. For example, (i) recommended ranging codes and slots may be used; (ii) fanging operation may be initiated with previously estimated timing and power (iii) capability negotiation and setup of default service flows may be omitted.

The station shall further verify with the FS that the dynamic service resources committed previously by BS-0 are still available in the new failover topology, since those are provided only on a best effort basis. This includes any service flows, as well as multicast flows. If available, configurations from the BSB-CFG shall be used, for example, the flow IDs, and new set of multicast security keys.

Several control messages are used in the invention. Some are new messages that are not defined in the current 802.16 standard working document. Some others are defined in the 802.16 standard, but require some modifications. Below is a table that explains these details, and further describes the messages and their abbreviations.

| Message | Full name | New/Modified | Notes |
| --- | --- | --- | --- |
| SBC-REQ | Subscriber Station basic capability request message | Modified | Used in network entry for capability negotiation. |
| SBC-RSP | Subscriber Station basic capability response message | Modified | Used in network entry for capability negotiation. |
| NBR-DIS-REQ | Neighbor Discovery request message | New | Base Station initiated neighbor discovery |
| NBR-DIS-RSP | Neighbor Discovery response message | New | List of neighbors report to the base station. |
| BSB-CFG | Base Station Backup Configuration | New/Modified | Keep alive message; contains the failover topology information. |
| DSx-REQ | Dynamic Service "x" Request Message | N/A | DSx can be either DSA, DSC, or DSD. It refers to Addition, Change, or Deletion, respectively. |
| DSx-RSP | Dynamic Service "x" Response Message | Modified | Modified for informing Failover Station only. |
| DSx-ACK | Dynamic Service "x" Acknowledgement Message | Modified | Modified for informing Failover Station only. |

Thus the base station may be configured to transmit a periodic keep-alive message or a defined trigger such that if the base station fails, dependent stations are capable of detecting the failure, and may be further configured to act as a failover station in a failover topology. Likewise, the mobile station may be configured to detect when a base station depended upon by the mobile station has failed and act as a base station if previously instructed to do so as part of a failover topology.

Figure 4:
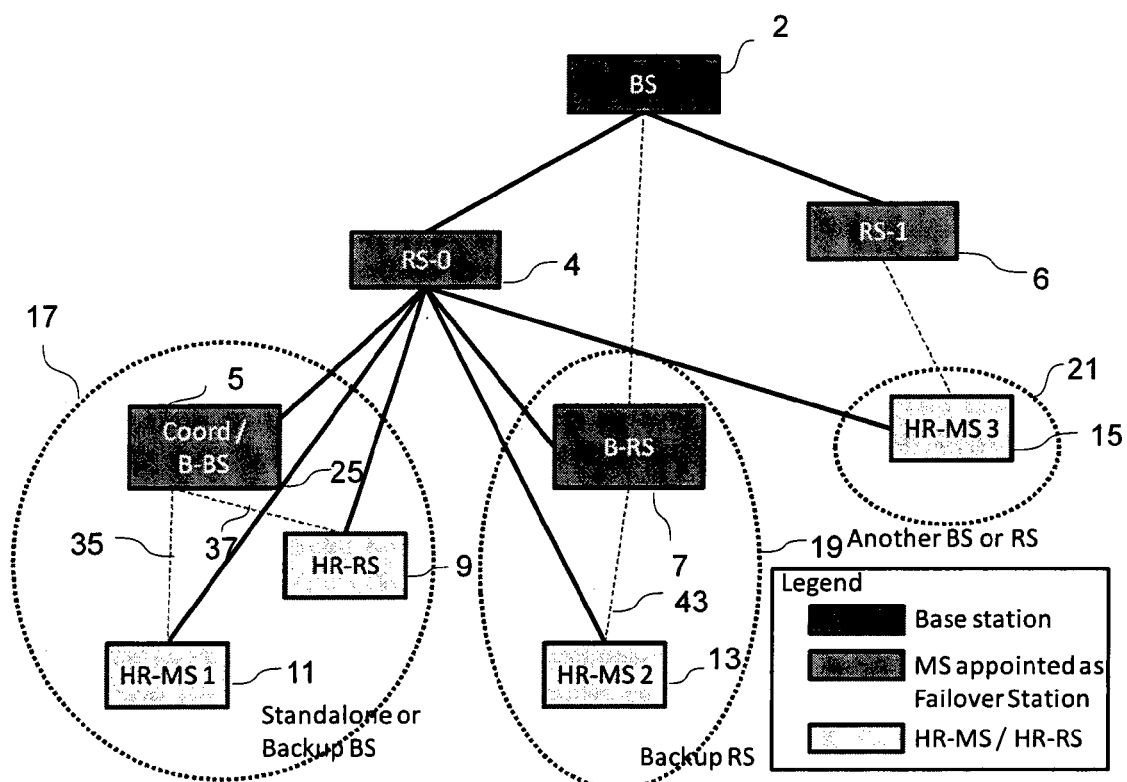

With reference to FIG. 4, the procedure described above may similarly be applied when the infrastructure station is a relay station as well as a base station as previously described. Thus if RS-0 4 or RS-1 6 fail, networks 17, 19, and 21 may be created as part of a failover topology.

In order to provide continuous network connectivity when its backhaul is lost, an HR-BS (affected HR-BS) utilizes its relay function to communicate with another HR-BS. During this period, the affected HR-BS may be using a different set of physical channel parameters for its subordinate stations. When its backhaul resumes operation, the affected HR-BS may drop the relay function and provide network connectivity on its own. The affected HR-BS may switch to its original physical channel parameters in order to benefit most from any original cell planning done by the operator.

Such a method speeds up physical channel search and synchronization, and eliminates any signaling for conveying the original set of physical channel parameters. Prior to activating its relay function, the affected HR-BS shall save the set of configuration of the physical channel parameters. This includes the DL and UL transmit parameters (Preamble Index/Subchannel Index, PHY profile ID, or PHY mode ID), BSID, and other TLV settings.

When the relay function is activated, the HR-BS shall inform its subordinate stations that a change in network topology has occurred, but the original set of configuration is saved. The respective subordinate stations shall save this original set of configuration as well. This includes the aforementioned physical channel parameters and also SS-specific configuration data.

The assignment need not be reserved since it only serves to reduce contention between subordinate stations during network reentry. When the backhaul resumes service and the affected HR-BS decides to drop the relay function, the HR-BS shall signal its subordinate stations that a resumption of network service will occur. In addition, it assigns a unique ranging slot or code to each subordinate station whenever possible before relinquishing the relay function. After relinquishing the relay function, the HR-BS shall resume operation as a base station and allow subordinate stations to perform fast network re-entry in the next few frames or superframes. This could be an optimized handover procedure as defined in IEEE 802.16-2009 or IEEE 802.16m in which the HR-BS hands over the subordinate station to itself.

The respective subordinate station who wishes to join the same HR-BS will listen for the HR-BS preamble (or PA-preamble) using the saved physical channel parameters. It will use the assigned ranging slot and/or code to periodic ranging (not initial ranging) so that the contention with other subordinate stations is minimal. It may then skip some steps of the regular network entry (e.g., optimized handover procedure) to re-enter the network.

The HR-BS and the subordinate stations shall retain and reuse the basic and management CIDs or STIDs that are established while in relay mode so that the registration phase can be skipped as well. This can be detected in the initial ranging request messages from the subordinate stations by the HR-BS: the BSID field is the same for HR-BS (while in RS mode) and subordinate stations, and is pointing to the previous superordinate of HR-BS.

In order provide better network connectivity to other neighboring stations when a disruption occurs, an HR-MS (affected HR-MS) can change its mode to an HR-RS mode. It may be attached to the same HR-BS, or another HR-BS. During this period, the affected HR-MS in HR-RS mode may be using a different set of physical channel parameters for its subordinate stations. When signaled to resume operation after the disruption is serviced, the affected HR-MS changes its RS-mode back to an ordinary HR-MS mode. The affected HR-MS may either choose to re-enter the current new HR-BS, or the original HR-BS. In either case, this method speeds up the physical channel search and synchronization, and eliminates any signaling for conveying the original set of physical channel parameters. Prior to changing its mode, the affected HR-MS shall save the set of configuration of the physical channel parameters of the original cell managed by the original HR-BS. This includes the DL and UL transmit parameters (Preamble Index/Subchannel Index, PHY profile ID, or PHY mode ID), BSID, and other TLV settings. The HR-MS also saves SS-specific configuration data. If the serving BS of the affected HR-MS in RS mode is a new HR-BS, the affected HR-MS should save the same set of configuration under this new HR-BS as well.

When signaled to resume MS operation, the affected HR-MS uses the respective saved configuration for fast network re-entry to either HR-BS. The signal to resume MS operation may include a reserved or recommended ranging slot or code similar to the previous section for zero contention.

If the HR-BS is the same before and after mode switch, then CID or STID can be reused and the registration phase of network entry can be skipped. This can be detected in the initial ranging request message from the HR-MS by the HR-BS, since the BSID field will be the same.

In order to provide network connectivity to other stranded neighboring stations when a BS failure occurs, an HR-MS (affected HR-MS) can change its mode to an HR-BS mode for standalone network operation. During this period, the affected HR-MS in BS mode may be using a different set of physical channel parameters for its subordinate stations. When a HR-BS is detected within range, the HR-MS in BS mode may choose to resume operation as a HR-MS and attach itself with the newly detected HR-BS. The newly detected HR-BS may be the repaired HR-BS, or a newly installed HR-BS to replace the failed BS. In either case, it makes much sense for the new HR-BS will use the original physical channel parameters in order to benefit most from any original cell planning done by the operator.

Such a method speeds up BS detection, physical channel search and synchronization, and eliminates any signaling for conveying the original set of physical channel parameters. Prior to changing its mode to BS, the affected HR-MS shall save the set of configuration of the physical channel parameters of the original cell managed by the original HR-BS. The set of physical channel parameters include DL and UL transmit parameters (Preamble Index/Subchannel Index, PHY profile ID, or PHY mode ID), BSID, and other TLV settings. The HR-MS may also save SS-specific configuration data under the original HR-BS since configuration is likely to be the same for the repaired one.

After switching to BS mode and operating in standalone network, the affected HR-MS will attempt to reconnect to an existing BS to resume network connectivity. While in BS mode, the affected HR-MS can prioritize channel scanning with the original set of physical channel parameters.

When a new HR-BS is detected and the HR-MS in BS mode decides to resume network connectivity via the new HR-BS, the affected HR-MS uses saved configuration for fast network re-entry to the newly detected HR-BS. In particular, the HR-MS uses the original HR-BS BSID and previous CID or STID in the ranging request message for fast network re-entry. Then, the new HR-BS will be able to detect that the HR-MS is a previous subordinate prior to failure, and proceeds to skip relevant phases with fast network re-entry after acknowledging the ranging response.

Since subordinate stations of the affected HR-MS in BS mode are likely to resume network connectivity via the new HR-BS as well, the HR-MS can arrange for minimal contention network re-entry for its subordinate stations, via a signaling message before the mode switch, by assigning them with unique ranging slots or codes. The assignment need not be reserved since it only serves to reduce contention between subordinate stations during network reentry. Fast network re-entry can be supported as well. This is similar to the first case where the HR-BS in RS mode switches back to BS mode and arranges for minimal contention for its subordinate stations.

Figure 5:
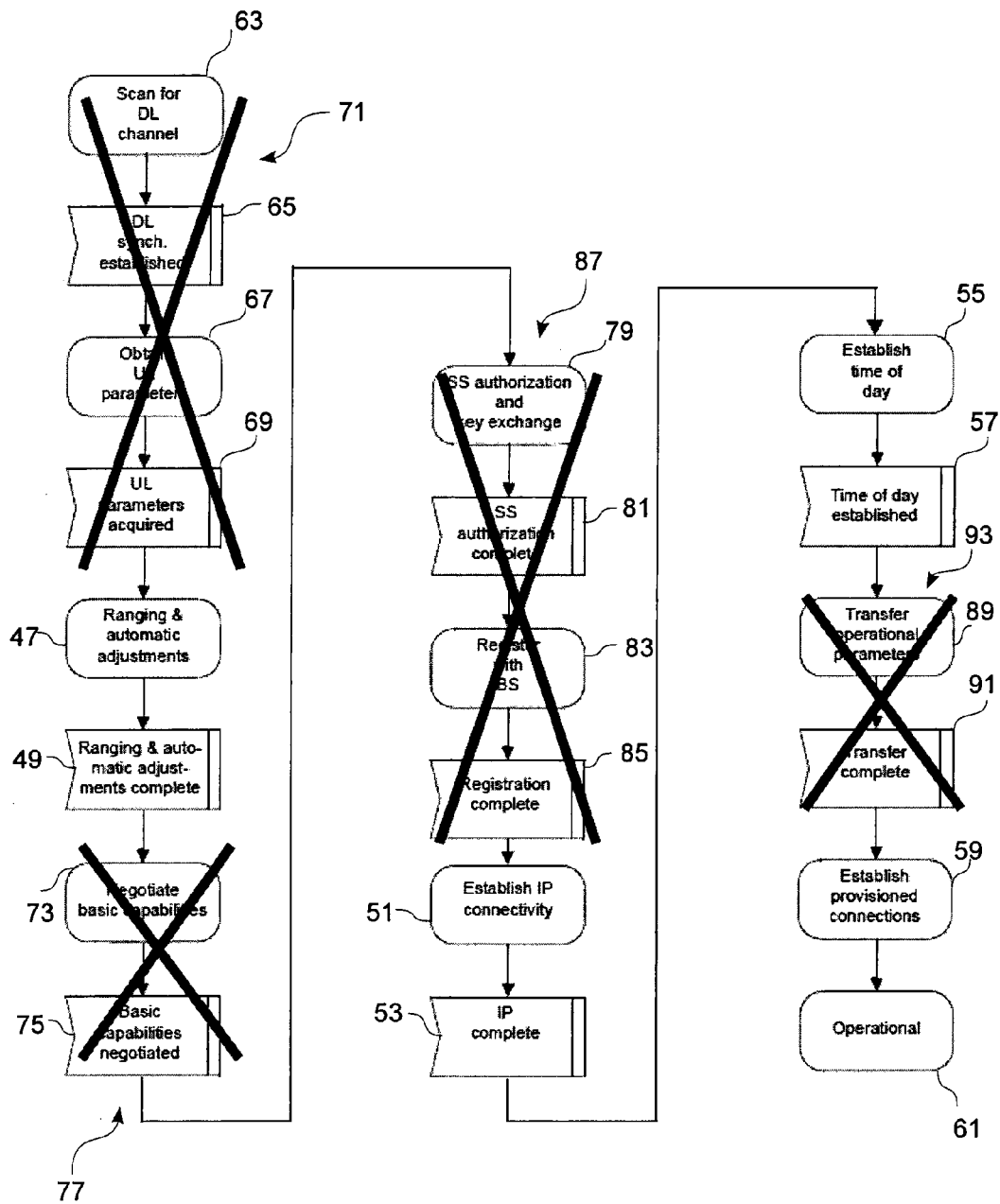
FIGS. 5-6 show flow diagrams according to embodiments.
Figure 6:
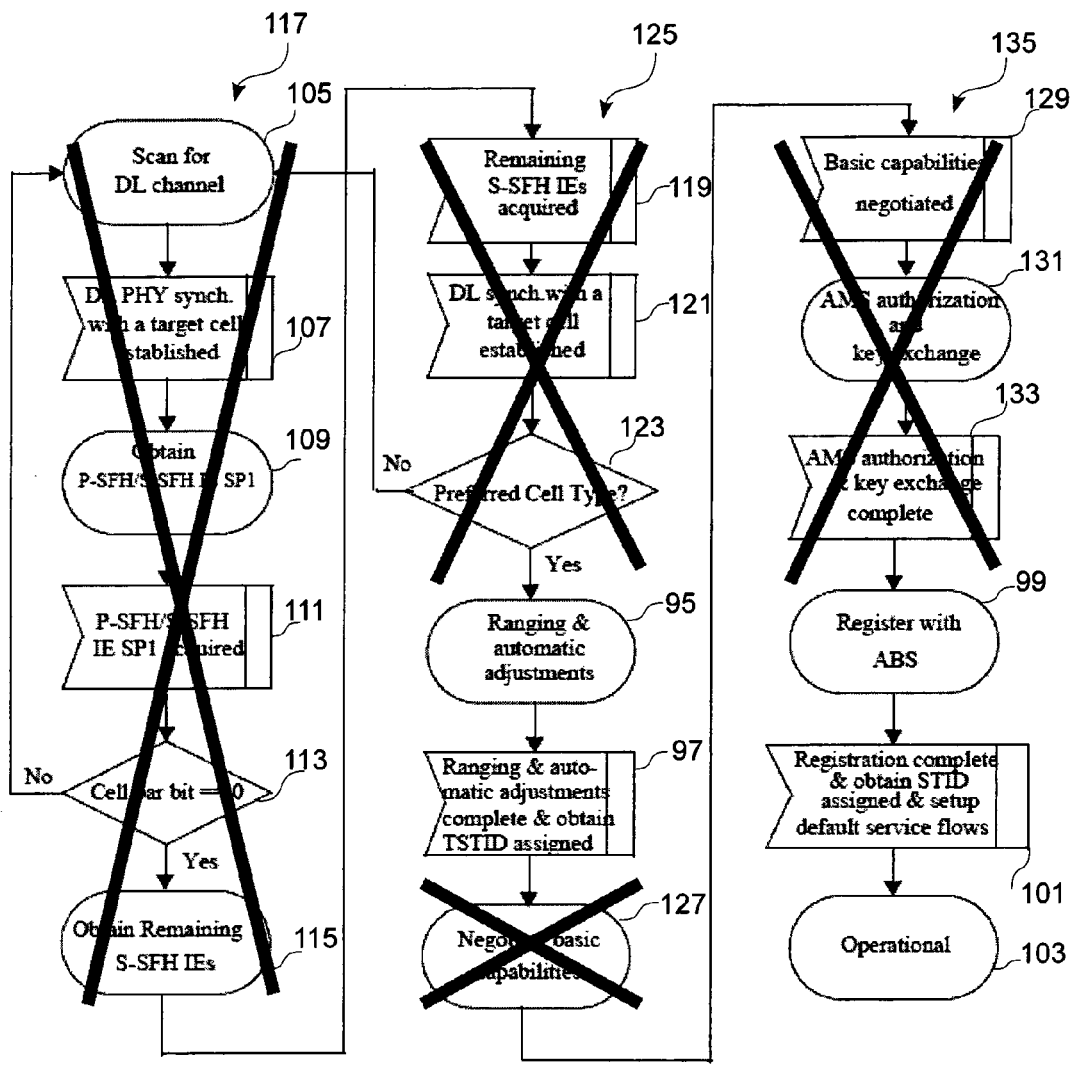

FIGS. 5-6 show flow diagrams according to embodiments. Fast Network re-entry is done by skipping a few steps in the regular network entry procedure. The procedures defined for the IEEE 802.16-2009 air interface and IEEE 802.16m air interface are shown. In the IEEE 802.16-2009 air interface, normal network entry proceeds by scanning 63 for a DL channel, establishing 65 a DL synch, and obtaining 67 and acquiring 69 UL parameters. Those processes 63, 65, 67, 69 are alternatively numbered as block 71 and may be not be necessary during fast network re-entry. In both IEEE 802.16-2009, the fast network re-entry begins with periodic ranging 47/49, 95/97 with the HR-MS sending a ranging request message (RNG-REQ or AAI-RNG-REQ). This message should indicate whether fast network re-entry is used, along with the relevant BSID and previous CID or STID in order for the BS to identify whether the HR-MS is resuming to its original mode. If identified, the HR-BS can proceed to reuse the CID or STID connections and acknowledge the fast network re-entry through relevant fields in the ranging response message (RNG-RSP or AAI-RNG-RSP).

In 802.16n network, we have to consider three types of links, i.e. relay link between HR-BS and HR-RS or HR-RS and its subordinate HR-RS, access link between access HR-RS and HR-MS as well as direct link between HR-MSs that are allowed to perform HR-MS forwarding. Path discovery could be done through the scanning during network entry and initialization. Furthermore a better path can be discovered with the help of the measurements and the relevant reports of the relay link, access link and direct link between HR-MSs. All the reports are sent to HR-BS. The scanning control messages can be based on those defined in 802.16m e.g. MOB_SCN-REQ/RSP/REP. Since HR-BS has the knowledge of the topology within its cell, it can select the path centrally and update the path information to the intermediate HR-RS and/or HR-MS along the path to HR-MS. In other words, we assume path selection is determined by HR-BS. The network topology information can be optionally sent to all the stations through the control message such as MOB_NBR-ADV.

Various embodiments support alternative path management. In first scheme (Method 1), only HR-BS and HR-MS save the information of alternative path for HR-MS. In second method (Method 2), HR-BS sends the control messages to the access station of the alternative path in addition to HR-MS. In third method (Method 3), HR-BS sends the control messages to the nodes (stations) along the alternative path to distribute the path information explicitly. The path information at least includes the identification of the path (source and destination pair or the connection ID or station flow ID that is unique in HR-BS for a flow) and other necessary network configuration information such as BSID/Cell ID, Physical Frequency that the access station is operating on, if available. At each station along the path, it should be able to identify its next hop and its previous hop, if available.

Compared to the second and third approach, the first method is implemented with lower cost but the HR-MS spends a longer time to recover the path in general. Second method is a trade-off between Method 1 and Method 3. Method 3 requires a highest cost of saving the information of alternative path in addition to that of current path. Moreover, the maintenance cost for alternative path could be very high when the topology of intermediate stations for the alternative path changes dynamically and the updating of path information consumes extra resource.

Since HR-MS doesn't identify HR-RS when it performs network entry with HR-RS, if the access station is an HR-RS, the alternative path information sent to HR-MS includes the identification of HR-RS such as Cell ID and physical frequency. It is very useful to send physical level ID and STID to the HR-MS if the HR-MS performs network entry through another HR-MS.

After HR-BS determines the alternative path for HR-MS, it delivers this backup path information to the HR-MS via control messages such as DSA-REQ. Note that the intermediate nodes along the alternative path don't store any information with regarding to this backup path.

HR-MS may then monitor the link between itself and the accessing station for alternative path through DL or UL signals, measuring either periodically or on-demand upon request from its access station, if it is allowed to do so, in addition to normal operation. HR-BS/HR-RS system parameters (e.g. BSID/Cell ID, carrier set, etc) and some necessary information of access station (e.g. station ID) should be sent to HR-MS for fast recovery.

Upon any change (e.g. topology change or link degradation) that affects the alternative path of the HR-MS, HR-BS will then determine the alternative path again. The change can be due to the measurement report on relay link, access link and direct link or backhaul failure. HR-BS will send out the control messages (e.g. DSD-REQ) to the HR-MS and the HR-MS, upon receiving the messages, should remove the current alternative path. The update of the alternative path should be sent to the HR-MS through current path from HR-BS, using the control messages such as DSA-REQ/RSP/ACK.

After HR-BS determines the alternative path for HR-MS, it delivers this backup path information to the HR-MS and the access station along the alternative path via control messages, for example a DSA-REQ. Note that the intermediate nodes along the alternative path except the access station don't store any information with regarding to this backup path.

The access station may schedule the link measurement for HR-MS to monitor the link between HR-MSs and the accessing station for alternative path through DL or UL signals, measuring either periodically or on-demand upon request from its access station. HR-BS/HR-RS system parameters (e.g. Cell ID, carrier set, etc) and some necessary information of access station (e.g. station ID) should be sent to HR-MS for fast recovery.

Upon any change (e.g. topology change or link degradation) that affects the alternative path of the HR-MS, HR-BS will then determine the alternative path again. The change can be due to the measurement report on relay link, access link and direct link or backhaul failure. HR-BS will send out the control messages (e.g. DSD-REQ) to the access station of the previous selected alternative path and the access station, upon receiving the messages, should remove the alternative path if it is no longer in the alternative path. The update of the alternative path should be sent to the HR-MS and the access station of the alternative path through the newly selected alternative path from HR-BS, using the control messages such as DSA-REQ/RSP/ACK.

After HR-BS determines the alternative path for HR-MS, it delivers this backup path information along the path to the MS via control messages (e.g. DSA-REQ). In this method the intermediate nodes along the alternative path (including the HR-MS) should store the information with regarding to this backup path.

HR-MS may then monitor the link between itself and the accessing station for alternative path through DL or UL signals, measuring either periodically or on-demand upon request from its access station, if it is allowed to do so, in addition to normal operation. HR-BS/HR-RS system parameters (e.g. Cell ID, carrier set, etc) and some necessary information of access station (e.g. station ID) should be sent to HR-MS for fast recovery. For 802.16m networks, without HR-MS forwarding, this method is same as previous method.

Upon any change, that affects the alternative path for the HR-MS, for example a topology change or link degradation, HR-BS should determine the alternative path again. The change can be due to the measurement report on relay link, access link and direct link or backhaul failure. HR-BS will send out the control messages (e.g. DSD-REQ) to the intermediate nodes along the previous selected alternative path and all these nodes (stations), upon receiving the messages, should remove the alternative path if it is no longer in the alternative path. The update of the alternative path should be sent to the nodes (stations) along the newly selected alternative path, including the HR-MS, using the control messages such as DSA-REQ/RSP/ACK.

The super-ordinate station of SPOF detects and reports to the controlling HR-BS through its upstream HR-RSs using the control messages such as MOB_NBR-ADV. The sub-ordinate station of SPOF can also detect and report the update to the HR-MS through its downstream HR-RS if it can re-associate with the HR-network. Otherwise the report update is sent out only when the detecting station can do network reentry with an HR-BS/HR-BS. In normal case, HR-MS is able to detect it cannot connect to the network without receiving the signals such as downlink synchronization signals from either HR-BS/HR-RS or HR-MS (if MS forwarding is performed). The super-ordinate station of SPOF detects the failure through UL signals from its subordinate station.

When there are multiple points of failure (MPOF), the super-ordinate station of MPOF that is nearest to BS and the sub-ordinate station of MPOF that is nearest to MS should perform the detection.

Usually when the received signals of all the connections from the point of failure are not detectable for some period of time (e.g. a few super-frames), SPOF may be deemed to occur. HR-BS may collect multiple reports with regarding to the same point of failure if applicable. In this case the collective reporting messages from all the stations around the failure point are helpful to make a correct decision that SPOF has occurred. This decision triggers the action for SPOF (that will establish the path using alternative path for the HR-MS) rather than handover, unless the alternative path fails to be setup.

If the failure is due to backhaul connection lost, the wireless connection in the 802.6n is alive. The point of failure can distribute the information to all the stations within its control, e.g. via downlink. Such report is helpful to switch the HR-MS to alternative path for backhaul access if the HR-MS requires. In this case, the alternative path can be established to replace the current path. Some nodes may perform mode change to reconstruct the connection to the backhaul if necessary.

The report will be sent to controlling HR-BS of the alternative path. If the controlling HR-BS is same as the current serving HR-BS, the above can be ignored and then the path recovery may be requested by controlling HR-BS via control messages such as DSA-REQ along the path to the access station to establish the path for the HR-MS, by using the stored alternative path.

A HR-MS1 can perform network entry and initialization with HR-RS through either a HR-MS2 or a HR-MS3 forwarding. After HR-BS determines HR-MS2 as the access station of current path and HR-MS3 as the access station of the alternative path for HR-MS1, HR-BS sends the path information through control messages such as DSA-REQ to HR-MS1. Dependent on the proposed method (Method 1, 2 and 3), the path information is stored differently. Method 1 requires that HR-BS and HR-MS1 save the alternative path and Method 2 requires HR-BS, HR-MS3 and HR-MS1 keeps the alternative path information. Method 3 instead requires that all the stations of HR-BS, HR-RS, HR-MS3 and HR-MS1 store the alternative path information for HR-MS1.

If HR-MS2 fails suddenly, HR-RS should be able to detect, in this case, it will inform HR-BS and then HR-BS will send the update to HR-MS3, which is the access station of the backup path for HR-MS1. HR-MS3 once received this information, it can send out the signals to allow HR-MS1 to perform network re-entry (with minimal steps and lower latency e.g. using dedicated ranging code) to continue the communication. In this example, HR-MS1 is also able to detect the SPOF, it can search for the synchronization signals from HR-MS3 and its related access information (e.g. SFH or a modified version of SFH) according to the pre-arrangement for alternative path, for a faster recovery of path. The normal procedure of network entry for HR-MS1 is as follows:

Scan for DL channel and establish DL PHY synchronization with the HR-MS3

Obtain DL/UL parameters (from P-SFH/S-SFH IEs etc.) and establish DL MAC synchronization Perform ranging and automatic adjustment Negotiate basic capability Perform MS authorization and key exchange Perform registration, and setup default service flows.

However, in this example, the network re-entry of HR-MS1 is very simple, as it can skip a few steps, e.g. (a) scanning for DL channel; (b) obtaining DL/UL channel parameters and DL MAC synchronization may be expedited through optimizing path recovery steps; (c) Perform ranging and automatic adjustment if it is done it beforehand (e.g. when HR-MS1 operates in scanning mode of connected state, it can perform ranging and automatic adjustment with HR-MS3); (d) MS authorization and key exchange can be skipped; (f) Performing registration and default service flows can also be skipped or expedited.

If HR-MS has been informed of SPOF or detected SPOF, HR-MS searches its access station of stored alternative path. If the access station is an HR-BS or HR-RS, HR-MS will scan for access link. Otherwise, if the access station is HR-MS, HR-MS will scan for direct link among HR-MSs. Once the HR-MS finds the access station pertaining to the alternative path, HR-MS can perform network re-entry with the controlling HR-BS of the access station of stored alternative path for a fast recovery of the path.

During network re-entry, the steps to scan for DL channels and establish DL PHY synchronization with the HR-BS/HR-RS (or HR-MS if applicable) can be done in a faster way with the known system parameters for the alternative path. For example, if Cell ID and physical frequency is known, scanning for DL channels can be skipped or expedited. If the HR-MS had previously received a MOB_NBR-ADV message including target BSID, Physical Frequency, some information contained in UL-MAP and DL-MAP, this process may be expedited. DL PHY synchronization with HR-BS/

HR-RS (or HR-MS if applicable) is expedited by the given DL channel information stored along with the alternative path information that is acquired before path recovery. The HR-MS shall synchronize to the DL transmissions of the target access station and obtain DL and UL transmission parameters.

It is feasible to obtain some downlink (DL) parameters (from P-SFH/S-SFH IEs or even through some procedure that delivers this information before the HR-MS switches to the alternative path etc) and establish DL MAC. For uplink (UL) parameters, the HR-MS may also obtain it from stored alternative path information.

Note that the HR-MS can decode P-SFH after obtaining system bandwidth and permutation information in the early stage from stored alternative path information even without PA-Preamble and SA-Preamble detection. Also, the HR-MS is able to skip some S-SFH sub-packet such as S-SFH SP3. S-SFH sub-packet 1 includes network re-entry information and is transmitted once every two super-frames. S-SFH sub-packet 2 includes initial network re-entry information and network discovery information, which is transmitted once every four super-frames. It is transmitted once every four super-frames. S-SFH sub-packet 3 contains remaining essential system information. The frequency of transmission is not determined but should be more than four super-frames. Since at most one S-SFH sub-packet is transmitted in a super-frame, if all the necessary information can be captured in stored alternative path information, the network re-entry procedure should be faster.

HR-MS and target HR-BS/HR-RS (or HR-MS if applicable) shall conduct initial ranging per 802.16m standard if the initial ranging hasn't been done. If HR-MS RNG-REQ includes serving BSID, then target HR-BS/HR-RS (or HR-MS if applicable) may make a request to serving HR-BS/HR-RS for information on the HR-MS over the backhaul and serving HR-BS/HR-RS may respond, if applicable. Regardless of having received HR-MS information from serving HR-BS/HR-RS, target HR-BS/HR-RS (or HR-MS if applicable) may request HR-MS information from the backhaul.

After it performs ranging and automatic adjustment, it may continue without going through the steps of basic capability negotiation, HR-MS authentication/key agreement and registration procedures including default service flow setup, which can be done beforehand during alternative path setup.

If the target HR-BS/HR-RS (or HR-MS if applicable) had previously received alternative path establishment notification for the HR-MS from the serving HR-BS/HR-RS over the backhaul, then the target HR-BS/HR-RS (or HR-MS if applicable) may allocate one or more non-contention-based initial ranging opportunities.

The temporary STID (TSTID) may be assigned if STID of the HR-MS hasn't been allocated by the HR-BS of the alternative path. Otherwise, the assignment of this TSTID can be skipped.

Network re-entry proceeds per 802.16m standard except as may be shortened by target HR-BS/HR-RS (or HR-MS if applicable) possession of HR-MS information obtained from serving HR-BS over the backhaul. This type of alternative path management is considered optimized path recovery. If the optimization of path recovery is not available, it can switch to the normal procedure of network re-entry before path recovery.

HR-MS information (or HR-MS context) may include static context and dynamic context, where static context consists of all configuration parameters that were acquired during initial network entry or later, via exchange of information between the HR-BS and HR-MS (for example, all SBC-RSP and REG-RSP parameters, all service flow encodings from DSx message exchanges, etc.) and dynamic context consists of all counters, timers, state machine status, data buffer contents (e.g., ARQ window). Transaction states, which may impact configuration parameters, are considered dynamic context until complete, which by then is considered static context.

Security context is always considered static context. For fast recovery of the path, it is helpful to exchange key information of the HR-MS between these two HR-BSs.

Depending on the amount of that information target HR-BS/HR-RS (or HR-MS if applicable) may decide to skip one or several of the following network entry steps:
1) Negotiation of basic capabilities
2) PKM authentication phase
3) TEK establishment phase
4) REG-REQ message phase
5) Unsolicited REG-RSP message phase For example, it may be convenient to skip the negotiation of basic capabilities.

The station ID, if not allowed to retain for alternative path, should be sent to the HR-MS and the access station, if required. Note that station ID is unique only to an HR-BS. In the case that serving HR-BS/HR-RS is different from the controlling HR-BS/HR-RS of the alternative path, the serving HR-BS/HR-RS should negotiate with the controlling HR-BS/HR-RS of the alternative path for a unique station ID.

During network entry, serving HR-BS/HR-RS/HR-MS may allocate an UL bandwidth for transmission of BR (bandwidth request) with the assigned STID header, without a contention-based bandwidth request from the HR-MS by setting the Unsolicited bandwidth grant indicator in an RNG-RSP to the HR-MS.

After registration complete, IP address may be retained without change and IP connectivity can be also skipped accordingly if applicable.

In the case of HR-BS failure, the path cannot be established by the failed HR-BS with the alternative path. The controlling HR-BS of the alternative path for the HR-MS may poll the serving HR-BS of the HR-MS regularly. Once the serving HR-BS is detected as failure, the controlling HR-BS of the alternative path should indicate to the access station along the alternative path to admit the network re-entry of the HR-MS due to HR-BS failure. For example this target access station may allocate the dedicated ranging code to the HR-MS with the specified STID and its associated Cell ID to shorten the process of network reentry after SPOF.

Contention free ranging during network re-entry may be achieved without reservation of ranging codes as described in the previous section. However, an additional preparation step is required at the serving HR-BS/HR-RS for its subordinate stations.

For every subordinate station, the HR-BS/HR-RS pre-allocates it with a unique ranging code of the target HR-BS/HR-RS of the alternative path. Note that the ranging codes are not reserved at the alternative path. But it is still guaranteed that there will be no contention among the subordinate stations during network re-entry after SPOF since the ranging codes are unique. This will speed up network re-entry.

After network re-entry using stored information, the new path will be established for the HR-MS switching the path. The stations engaging in path establishment will use the stored path information or the delivered path information sent by serving HR-BS or controlling HR-BS.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An infrastructure station in a cellular mobile communication system, the infrastructure station comprising:

an infrastructure station core configured to provide infrastructure station functionality to a plurality of dependent stations;

a topographer configured to discover a network topology and designate a failover topology from the network topology for use in the event that the infrastructure station fails thereby no longer being capable of providing infrastructure station functionality to the plurality of dependent stations, the failover topology comprising failover stations; and a synchronizer configured to periodically provide timing estimates of dependent stations to failover stations such that network reentry after infrastructure station failure is shorter than normal network entry;

wherein the infrastructure station is configured to process a SBC-REQ message from a dependent station when a dependent station performs network entry and requests infrastructure station functionality from the infrastructure station, the SBC-REQ message indicating that the dependent station is capable of being a failover station.

2. The infrastructure station as claimed in claim 1, wherein in discovering the network topology, the infrastructure station is configured to periodically instruct dependent stations to perform ranging with a set of ranging codes while concurrently instructing dependent stations capable of being failover stations to listen for the set of ranging codes and to report any resulting neighbor discoveries back to the infrastructure station.

3. The infrastructure station as claimed in claim 1, the infrastructure station further comprising a legacy module configured to announce the failover stations to dependent stations having legacy hardware.

4. The infrastructure station as claimed in claim 1, wherein the infrastructure station is configured to inform the failover stations of dynamic service requests and changes affecting radio resource allocation of each failover station.

5. The infrastructure station as claimed in claim 1, wherein the infrastructure station is configured to maintain multicast groups and communicate the multicast groups to the failover stations in the failover topology.

6. The infrastructure station as claimed in claim 1, wherein the infrastructure station is configured to act as a failover station in a failover topology.

7. A mobile station in a cellular mobile communication system, the mobile station comprising:

a mobile station core configured to provide mobile station functionality by associating with a base station; and a failover station core configured to provide base station functionality to a plurality of dependent stations in the event that the mobile station is instructed to act as a base station as a result of a base station failure;

wherein the mobile station is configured to send a SBC-REQ message upon network entry requesting base station functionality from a base station, the SBC-REQ message indicating that the mobile station is capable of being a failover base station.

8. The mobile station as claimed in claim 7, wherein the mobile station is configured to perform ranging with a set of ranging codes when instructed to do so by a base station.

9. The mobile station as claimed in claim 8, wherein the mobile station is configured to listen for the set of ranging codes and to report any resulting neighbor discoveries back to the base station when instructed to do so by the base station.

10. The mobile station as claimed in claim 7, wherein the mobile station is configured to maintain information regarding dynamic service requests for use by the failover station core in the event that the mobile station is instructed to act as any one of a base station and a relay station as a result of a base station failure.

11. The mobile station as claimed in claim 7, wherein the mobile station is configured to maintain information on multicast groups for use by the failover station core in the event that the mobile station is instructed to act as any one of a base station and a relay station as a result of a base station failure.

12. The mobile station as claimed in claim 7, wherein the mobile station is configured to detect when a base station depended upon by the mobile station has failed and act as any one of a base station and a relay station if previously instructed to do so as part of a failover topology.

13. A method for maintaining persistent communication in the event of a base station failure in a cellular mobile communication system, the cellular mobile communication system comprising at least two mobile stations and a communication network for providing a communication connection between the at least two mobile stations via at least one base station of the communication network, the method comprising:

discovering a network topology;

designating a failover topology from the discovered network topology for use in the event that an infrastructure station fails thereby no longer being capable of providing base station functionality to a plurality of dependent stations;

providing fast network entry information such that network reentry after an infrastructure station failure is shorter than normal network entry; and storing the failover topology in a distributed manner throughout the cellular mobile communication system;

wherein the mobile stations are configured to send a SBC-REQ message upon network entry requesting base station functionality from a base station, the SBC-REQ message indicating that the mobile station is capable of being a failover base station.

14. The method of claim 13, wherein the fast network entry information is recommended ranging codes and slots.

15. The method of claim 13, wherein the fast network entry information is estimated timing and power.

16. The method of claim 13, wherein storing the failover topology in a distributed manner throughout the cellular mobile communication system includes storing the failover topology in an infrastructure station and a mobile station.

17. The method of claim 13, wherein storing the failover topology in a distributed manner throughout the cellular mobile communication system includes storing the failover topology in an infrastructure station, a mobile station, and a failover station.

* * * * *